US012536379B2

(12) United States Patent
Gupta

(10) Patent No.: US 12,536,379 B2
(45) Date of Patent: Jan. 27, 2026

(54) SYSTEM AND METHOD TO GENERATE INTERPRETABLE EMBEDDINGS FOR DOMAIN SPECIFIC SMALL CORPUS

(71) Applicants: Robert Bosch GmbH, Stuttgart (DE); Robert Bosch Engineering and Business Solutions Private Limited, Bangalore (IN)

(72) Inventor: Rishabh Gupta, Bareilly (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 313 days.

(21) Appl. No.: 18/189,883

(22) Filed: Mar. 24, 2023

(65) Prior Publication Data

US 2023/0325602 A1 Oct. 12, 2023

(30) Foreign Application Priority Data

Mar. 28, 2022 (IN) .......................... 2022 4101 7737

(51) Int. Cl.
*G06F 17/00* (2019.01)
*G06F 40/30* (2020.01)
(52) U.S. Cl.
CPC .................................... *G06F 40/30* (2020.01)
(58) Field of Classification Search
USPC ........................................................... 704/9
See application file for complete search history.

(56) References Cited

U.S. PATENT DOCUMENTS

| 2020/0073882 | A1* | 3/2020 | Guggilla | G06N 3/0464 |
| 2020/0210491 | A1* | 7/2020 | Hajic | G06F 16/316 |
| 2020/0394509 | A1* | 12/2020 | Thomas | G06N 3/08 |
| 2022/0092097 | A1* | 3/2022 | Gupta | G06N 3/09 |
| 2022/0179896 | A1* | 6/2022 | Farrell | G06F 40/131 |

OTHER PUBLICATIONS

Pennington et al., "GloVe: Global Vectors for Word Representation", Proceedings of the 2014 Conference on Empirical Methods in Natural Language Processing (EMNLP), pp. 1532-1543, Oct. 25-29, 2014.
Mikolov et al., "Efficient Estimation of Word Representations in Vector Space", Sep. 7, 2013.

* cited by examiner

*Primary Examiner* — Satwant K Singh
(74) *Attorney, Agent, or Firm* — Maginot, Moore & Beck LLP

(57) ABSTRACT

A method and systems for generating interpretable and embeddings for a domain-specific small corpus of text-based documents are described. A processing module may obtain the plurality of text-based documents and perform a basic cleaning of each of the plurality of text-based documents. Further, the semantic infusion module may generate the semantically infused corpus using the semantic infusion technique. An embedding generation module is configured to compute the optimal dimensionality for the infused corpus and generate the infused optimal dimensional embeddings using word2vec technique. Further, the embedding generation module is configured to generate baseline optimal dimensional embeddings which can be used to evaluate in terms of interpretability and downstream classification task performance.

5 Claims, 2 Drawing Sheets

Figure 1:
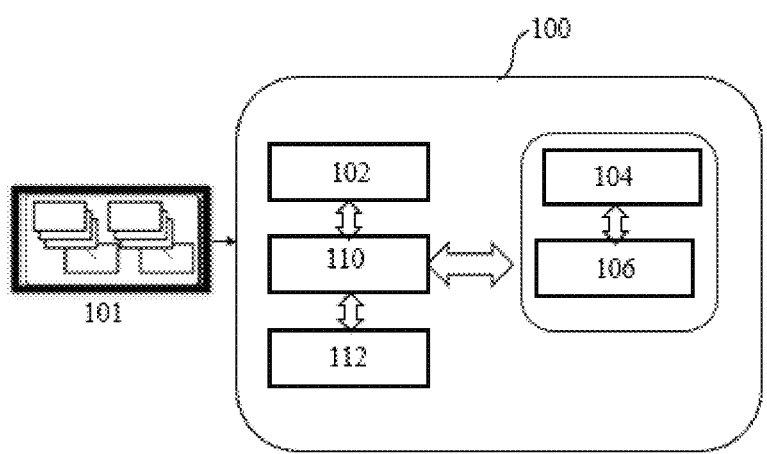

SYSTEM AND METHOD TO GENERATE INTERPRETABLE EMBEDDINGS FOR DOMAIN SPECIFIC SMALL CORPUS

FIELD OF THE DISCLOSURE

This application claims priority under 35 U.S.C. § 119 to patent application no. IN 2022 4101 7737, filed on Mar. 28, 2022 in India, the disclosure of which is incorporated herein by reference in its entirety.

The present subject matter relates, in general, to a system and method for generating highly interpretable and efficient embeddings for a domain-specific small corpus.

BACKGROUND OF THE DISCLOSURE

In natural language processing, word embedding is a term used for the representation of words for text analysis, typically in the form of a real-valued vector that encodes the meaning of the word such that the words that are closer in the vector space are expected to be similar in meaning. Word embeddings are a basic building block of modern NLP pipelines. A lot of efforts have been made to learn rich, efficient, and interpretable embeddings for large generic datasets available in the public domain. However, these embeddings have limited applicability for small corpora from specific domains such as automotive, manufacturing, maintenance, and support, etc.

Distributed representations of words, also termed as word embeddings, have been used extensively to excel at various applications such as parsing named entity recognition, image captioning and sentiment analysis. They have also proven effective in modeling cognitive operations such as the judgement of word similarity, and the brain activity elicited by specific concepts. However, these representations contain mappings of words to vectors of real numbers in dense and continuous space, and thus, inherently difficult to interpret.

Recent studies suggest that sparsity and non-negativity of the word embeddings are two important characteristics that make them interpretable. The sparsity makes each word vector contain a small number of active (non-zero) dimensions, which helps in increasing their separability and stability in the presence of noise. In addition, the studies define the notion of interpretability in terms of the coherence of dimensions of the word embeddings. In other words, the word embeddings are considered as interpretable if their dimensions denote specific semantic concepts. However, these studies are primarily focused on pretrained word embeddings like GloVe (Pennington et al., 2014) and word2vec (Mikolov et al., 2013). These pre-trained embeddings are generated using millions of documents from generic public domain datasets such as Wikipedia and Google News, which contain billions of words. Also, to interpret the thousands of dimensions of the sparse non-negative (hereafter 'SNN') word embeddings and understand the sense they correspond to, we still need human judges who put in manual efforts and read these unlabeled dimensions.

In recent years, businesses such as CRM, KPO, Knowledge Management, and Web Monitoring services have witnessed a large inflow of structured text streams. This presents an opportunity to use this data to discover "Emerging Topics" or "Trends" and analyze their dynamics, which can help in the decision-making processes. The traditional techniques for emerging trends analysis are the first choice to perform the task and these techniques can further be classified as either a supervised or an unsupervised method. In literature, existing solution have proposed supervised systems that use local and topical features of the words to predict the trends. To overcome the need of defining the features, unsupervised systems use volatility measures to capture change in the meaning of the terms by comparing their global contexts across different time slices. Existing solution have extensively used Latent Dirichlet Allocation (LDA), a generative probabilistic model, to detect trends either by clustering words around an entity or by detecting their evolution over time. In addition, these solutions have used measures of association such as Positive Pointwise Mutual Information (PPMI) and Pointwise Mutual Information (PMI) as the co-occurrence frequency-based scores to detect trends by creating word embeddings across different time slices. Further, such solutions attempt to solve the alignment problem in this domain by either mapping embeddings for same words across time slices or jointly developing the embeddings across time slices. In practice, the traditional trend analysis techniques are largely biased towards term frequency-based schemes that perform poorly especially in the cases of the domain-specific corpora where the dataset is not distributed uniformly across the time slices.

A related patent application No. 202241005163 discloses methods and systems for analyzing trends in a categorical dataset using semantic infusion.

BRIEF DESCRIPTION OF THE ACCOMPANYING DRAWING

Figure 2:
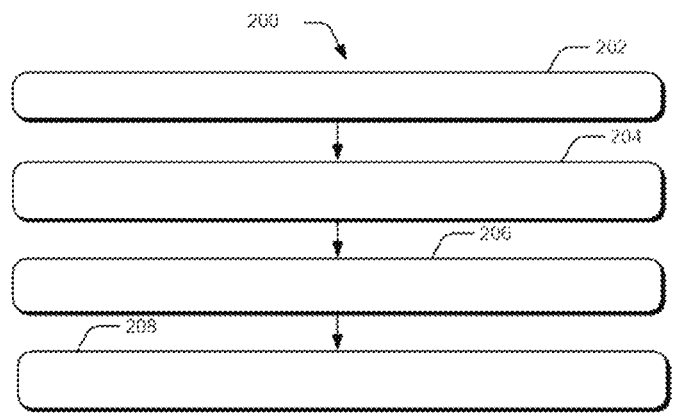

The detailed description is provided with reference to the accompanying figures, wherein:

FIG. 1 illustrates a system environment for generating interpretable and embeddings for a domain-specific small corpus of text-based documents, in accordance with an example implementation of the present subject matter, and FIG. 2 illustrates a flow chart of a method for generating interpretable and embeddings for a domain-specific small corpus of text-based documents, in accordance with an example implementation of the present subject matter.

DETAILED DESCRIPTION OF THE EMBODIMENTS

The present subject matter describes example methods and systems for generating interpretable and embeddings for a domain-specific small corpus of text-based documents. In the example methods and systems described herein, generate word embeddings named as SEMantically Infused Embeddings (SEMIE). These embeddings helps to enhance interpretability (both in terms of semantic similarities and dissimilarities) capabilities of SEMIE while representing them in SNN embedding space.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

The manner in which the methods and systems are implemented are explained in detail with respect to FIGS. 1-2. While aspects of described methods and systems can be implemented in any number of different devices, environments, and/or implementations, the examples are described in the context of the following system(s). It is to be noted that drawings of the present subject matter shown here are for illustrative purposes and are not drawn to scale.

FIG. 1 illustrates a system 100 environment for generating interpretable and embeddings for a domain-specific small corpus of text-based documents, in accordance with an example implementation of the present subject matter. The system 100 may be a computing system found in a wide range of electronic device types to process signals and/or states representative of a diverse of content types for a variety of purposes. Examples of the system 100 may include, but are not limited to, a laptop, a notebook computer, a desktop computer, a server, a cellular phone, and a personal digital assistant.

The system 100 may include a processing module 102. The processing module 102 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labelled as "processor(s)", may be provided through the use of dedicated hardware as well as hardware capable of executing computer-readable instructions.

Further, the system 100 may include a semantic infusion module 104, and an embedding generation module 106, coupled to the processing module 102. The modules 104 and 106 may be implemented as a combination of hardware and programming, for example, programmable instructions to implement a variety of functionalities of the modules 104 and 106. In examples described herein, such combinations of hardware and programming may be implemented in several different ways. For example, the programming for the embedding generation module 106 may be executable instructions. Such instructions may be stored on a non-transitory machine-readable storage medium which may be coupled either directly with the system 100 or indirectly (for example, through networked means). In the present examples, the non-transitory machine-readable storage medium may store instructions that, when executed by the processor, implement modules 104 and 106. In other examples, the modules 104 and 106 may be implemented as electronic circuitry.

The modules 104 and 106, amongst other things, includes routines, programs, objects, components, and data structures, which perform particular tasks or implement particular abstract data types. The modules 104 and 106, may also be implemented as, signal processor(s), state machine(s), logic circuitries, and/or any other device or component that manipulates signals based on operational instructions. Further, the modules 104 and 106, can be implemented by hardware, by computer-readable instructions executed by a processing unit, or by a combination thereof.

Further, the system 100 includes a storage device 110. The storage device 110 may include any non-transitory computer-readable medium including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The storage device 110 may store an activity data 103. In an example, the activity data 103 includes a plurality of text-based documents $D=\{d_k\}_{\{k=1\}}^{N}$ with each document $d_k$ having a category to a class ci in the set of M classes $C=\{ci\}_{\{t=1\}}^{M}$ and a time class $t_j$ in the set of L classes $T=\{tj\}_{\{j=1\}}^{L}$, and an infusion frequency value ($I_{freq}$).

In an example, the system 100 includes interface(s) 112. The interface(s) 112 may include a variety of interfaces, for example, interface(s) 112 for users. The interface(s) 112 may include data output devices. The interface(s) 112 may facilitate the communication of the system 100 with various communication and electronic devices. In an example, the interface(s) 112 may enable wireless communications between the system 100, such as a laptop, and one or more other computing devices (not shown).

Description hereinafter describes how generation of interpretable and embeddings for a domain-specific small corpus of text-based documents is performed by the system 100. The processing module 102 obtains a plurality of text-based documents D(101), where $d_k$ indicates the $k^{th}$ text-based document of the of the N number of text-based documents, where N is any positive number. In an example, N=1000. Each text-based document $d_k$ is a document that has text, such as names of vehicle parts, program source code, batch files and is readable by the processing module 102. In an example, the plurality of text-based documents D (101), may be obtained by converting a plurality of voice notes into text documents. Such a conversion may be performed by an automatic speech recognition technique.

The processing module 102 is configured to obtain and process a plurality of text-based documents 101. The processing of the plurality of text-based documents 101 may include removal of at least one of symbols, special characters, and predefined stop words from each sentence of the set of sentences of each document $d_k$ of the plurality of text-based documents D (101), by the processing module 102 for basic cleansing of the plurality of text-based documents D.

The semantic infusion module 104 is configured to generate semantically infused corpus from plurality of text-based documents 101, by using a semantic infusion technique. In general, semantic infusion is an efficient technique to associate meta-data within the text corpus of the text-based documents. Using this, special markers can be infused, which referred further as Anchors, within each document of the corpus. In an example, for a given document $d_i$ of length $l_{di}$ and belonging to a category class $c_j$ in the corpus, an anchor term $A_{cj}$ is infused at $I_{freq}$ random and non-consecutive positions within the document. For example, a sentence "new procurement scheme for farmers to focus on all crops." of a document class $c_j$=India will be processed as follows: "new A_India procurement scheme A_India for farmers to focus on all A_India crops."

In one embodiment, the semantic infusion module 104 performs the semantic infusion technique. The purpose of using this technique is to infuse additional meta-data (referred to as Anchors) within the clean sentences so that the vector space can be partitioned into the labeled regions. Given a clean sentence of length=len, of a document $d_k$ and category class $C_i$ and a time class $T_j$, the semantic infusion technique defines the Infusion Frequency ($I_{freq}$), where $I_{freq} \in R$, as the count of anchors to be infused in the clean sentence. The $I_{freq}$ is computed as given by the Equation 1, where the logarithmic function ensures that the $I_{freq}$ not $\propto$ len. This helps in making this technique a near-lossless in nature.

$$I_{freq}=(\lceil\log_2(len)/2\rceil) \quad \text{equation (1)}$$

The embedding generation module 106 is configured to compute an optimal dimensionality factor (d), from the semantically infused corpus and generate infused optimal dimensional embeddings using the word vector technique. In this example, the word vector is generated using Word2Vec technique. The embedding module 106 obtains the semantically infused corpus and compute the optimal dimensionality d, as explained before and generate the infused optimal dimensional embeddings using the word2vec method. In this embodiment, after computing said optimal dimensionality factor (d), the vocabulary size of the entire corpus 101 increases from V to (V+M), where V is the vocabulary size of the initial corpus, and M are the infused additional anchor terms. The infused optimal dimensionality factor is defined by;

$$E_{OPT}^{Inf} \in R^{(V+M) \times d}$$

In general, the selection of dimensionality hyper-parameter is critical for the efficiency of any word embeddings. In one example, the selection of dimensionality can be done by either in an ad hoc manner or using a grid search. In other examples "300", is the most commonly used dimensionality while generating the word embeddings using millions of text-based documents. However, for a domain-specific small corpus, a precise optimal dimensionality is needed, otherwise it may lead to sub-optimal performance. In the present invention, to identify the optimal dimensionality, a mathematical framework using system 100 is proposed. It determines the optimal dimensionality d, where d≤k, as the one which minimizes the Pairwise Inner Product (PIP) loss between an oracle embeddings $E \in R^{n=k}$ and the trained embeddings $E^- \in R^{n \times d}$.

The embedding generation module 106 is further configured to generate the semantically infused embeddings using the infused optimal dimensional embeddings. The embedding generation module 106 generates the infused optimal dimensional embeddings $E^{OPT}_{Inf} \in R^{(V+M) \times d}$ and generate the semantically infused embeddings $E_{SEMIE} \in R^{(V+M) \times d}$. For each column $C_i$ of the embedding's matrix $E^{OPT}_{inf}$, the column is sorted in the increasing order of values and then select the values of M anchor terms. For each anchor term $A_{Ci}$ and non-anchor word $w_{Ci}$ pair in the column $C_i$, embedding module 106 computes a semantic weight $w_s$, as given in Equation and add it to the value of non-anchor word $w_{Ci}$. This gives the semantically infused embeddings $E_{SEMIE}$.

$$w_s = A_{Ci}/|index(A_{Ci}) - index(w_{Ci})|$$

Intuitively, this means that in each column (dimension) of the semantically infused embeddings ESEMIE, the words in the neighborhood of the anchors will form semantically coherent groups. In one embodiment, the embedding generation module 106 generates baseline optimal dimensional embeddings $E_{OPT}$ which can be used to evaluate $E_{SEMIE}$ in terms of Interpretability and downstream classification task performance.

FIG. 2 illustrates a flow diagram of a method 200 for generating interpretable and embeddings for a domain-specific small corpus of text-based documents, according to an example. The method 200 can be implemented by processor(s) or device(s) through any suitable hardware, a non-transitory machine readable medium, or a combination thereof. Further, although the methods 200 is described in context of the system that is similar to the aforementioned system 100, other suitable devices or systems may be used for execution of the method 200.

In some examples, processes involved in the method 200 can be executed based on instructions stored in a non-transitory computer-readable medium. The processing module 102 may be communicatively coupled to the non-transitory computer-readable medium so as to fetch and execute computer-readable instructions from the non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 2, at block 202, a plurality of text-based documents $D = \{d_k\}_{\{k=1\}}^N$ is obtained and processed by the processing module 102 for generating interpretable and embeddings from text-based documents, from the plurality of text-based documents D (101). In one exemplary embodiment, the processing of the plurality of text-based document D (101) may include removing at least one of symbols, special characters, and predefined stop words from each sentence of the set of sentences jak of each document dx of the plurality of text-based documents for basic cleansing.

In an example, a plurality of voice notes may be received by the plurality of text-based documents may be obtained by the processing module 102, which are then converted into text documents for further proceedings. Each text-based document de of the plurality of text-based documents D includes a set of sentences jak and belongs to a class $c_i$ in a set of M classes defined by $C = \{c_j\}_{\{i=1\}}^M$, where M may have any value less than N.

At block 204, the method 200 may include a semantically infused corpus is generated by using a from plurality of text-based documents 101, by using a semantic infusion technique. The step 204 is carried out by the semantic infusion module 104. In one embodiment, the method 200 further comprising step for determining a number of words (L) in the respective sentence and computing an infusion frequency value ($I_{freq}$) based on the number of words (L) in each of the plurality of text-based documents (101), by the semantic infusion module 104.

At block 206, the method 200 may include computing an optimal dimensionality factor (d), from the semantically infused corpus and generating infused optimal dimensional embeddings using the word vector technique. Herein the word vector is generated by using Word2Vec technique. In this embodiment, after computing said optimal dimensionality factor (d), the vocabulary size of the entire corpus 101 increases from V to (V+M), where V is the vocabulary size of the initial corpus, and M are the infused additional anchor terms. At block 208, the method 200 further include generating the semantically infused embeddings using the infused optimal dimensional embeddings.

The present subject matter is employed to aid text analytics activities to operate seamlessly by generation of baseline optimal dimensional embeddings EOPT and semantically infused embeddings $E_{SEMIE}$ for each dataset, from the input text-based documents. With this technique, enhanced interpretability of SEMIE both in terms of semantic similarities and dissimilarities when transformed in SNN embedding space, can be achieved. In the proposed system 100 and method 200, datasets used and the generation of baseline optimal dimensional embeddings EOPT and semantically infused embeddings ESEMIE for each dataset, are determined.

Although aspects for the present disclosure have been described in a language specific to structural features and/or methods, it is to be understood that the appended claims are not limited to the specific features or methods described herein. Rather, the specific features and methods are disclosed as examples of the present disclosure.

I claim:

1. A computer-implemented method for generating interpretable embeddings for a domain-specific small corpus of text-based documents, comprising:
   obtaining and processing a plurality of text-based documents;
   generating a semantically infused corpus from the plurality of text-based documents, by using a semantic infusion technique;
   computing an optimal dimensionality factor, from the semantically infused corpus and generating infused optimal dimensional embeddings using a word vector technique;
   generating the semantically infused embeddings using the infused optimal dimensional embeddings;
   determining a number of words in a respective sentence and computing an infusion frequency value based on the number of words in each of the plurality of text-based documents; and
   performing machine-learning natural language processing activities on the plurality of text-based documents based on the semantically infused embeddings and the infusion frequency value.

2. The method as claimed in claim 1, wherein a word vector for the word vector technique is generated using a Word2Vec technique.

3. The method as claimed in claim 1, wherein after computing the optimal dimensionality factor, a vocabulary size of the small corpus increases from V to (V+M), where V is the vocabulary size of the small corpus, and M are infused additional anchor terms.

4. A system for generating interpretable embeddings for a domain-specific small corpus of text-based documents, the system comprising:
   a microprocessor configured to
      obtain and process a plurality of text-based documents;
      generate a semantically infused corpus from the plurality of text-based documents by using a semantic infusion technique; and
      compute an optimal dimensionality factor from the semantically infused corpus and generate infused optimal dimensional embeddings using the word vector technique;
      generate semantically infused embeddings using the generated infused optimal dimensional embeddings;
      determine a number of words in a respective sentence and compute an infusion frequency value based on the number of words in each of the plurality of text-based documents; and
      perform machine-learning natural language processing activities on the plurality of text-based documents based on the semantically infused embeddings and the infusion frequency value.

5. The system as claimed in claim 4, wherein a word vector for the word vector technique is generated using a Word2Vec technique.

* * * * *